July 8, 1952    K. W. MAYNARD ET AL    2,602,615
UTILITY STAND
Filed June 22, 1950
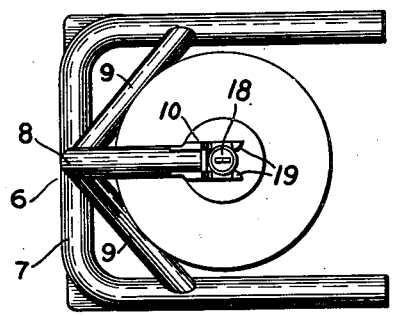
fig. 1
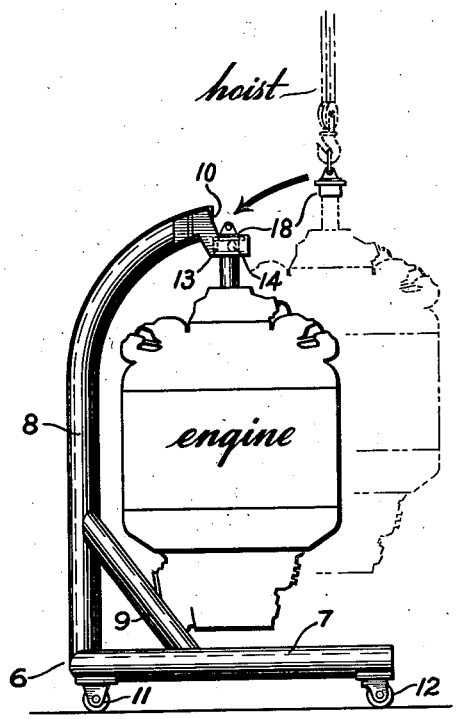
fig. 2
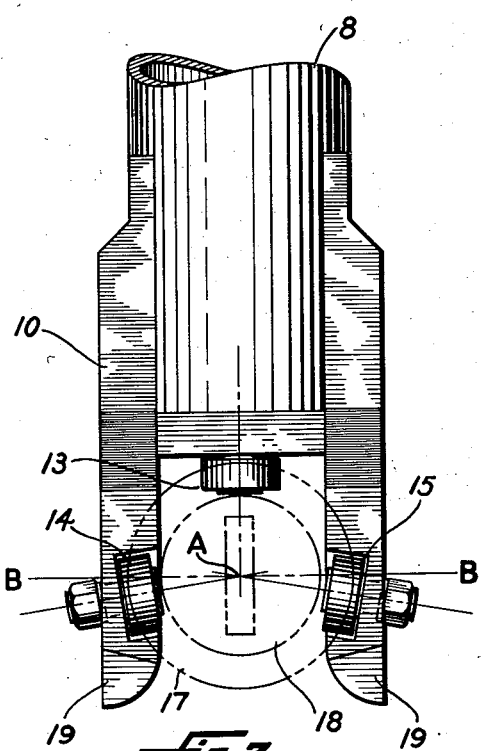
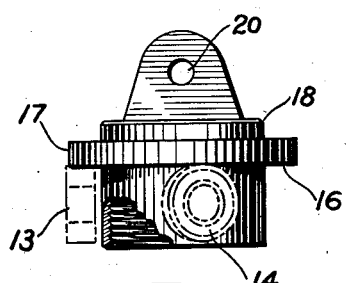
fig. 4

Patented July 8, 1952

2,602,615

UNITED STATES PATENT OFFICE 2,602,615

UTILITY STAND

Kermit W. Maynard, Chula Vista, and Joseph C. Weidel, Bonita, Calif., assignors to Rohr Aircraft Corporation, Chula Vista, Calif., a corporation of California Application June 22, 1950, Serial No. 169,660

4 Claims. (Cl. 248—13)

Our invention relates to a utility stand which is particularly useful for suspending engines and other articles during maintenance, overhaul, processing, or storage. It is particularly, but not necessarily, adapted for use with aircraft engines.

It is an object of this invention to provide a device for suspending an engine, which is capable of receiving such engine directly from the hook of an overhead crane, hoist or other handling equipment.

Another object is to provide a device of this class which facilitates the ready manual movement of the engine for accessibility.

Still another object is to provide a device of this class which may easily be adapted for use with articles other than engines, where a handling problem is created by the weight or nature of such articles.

A further object is to provide a device of this class, the structural members of which afford maximum accessibility to the suspended article.

Still a further object is to provide a device of this class which may be readily towed or shifted from one location to another, as by means of a tractor or similar equipment.

It is also an object to provide a device of this class which may, if desired, be permanently attached to a base, such as the floor or a structural member of a building.

The accompanying drawing illustrates a preferred embodiment of our invention adapted for use with aircraft engines, in which:

Figures 1 and 2 show a plan and a side view (respectively) of the stand with an aircraft engine suspended, Figure 3 is a detailed plan view of the suspension fork, and Figure 4 is an enlarged side view of the suspension cap.

Referring to Figures 1 and 2, the stand 6 consists of: the base member 7, essentially of a U-shape design; the upright post 8, attached to the said base member 7 and held in upright position by the braces 9; and the suspension fork 10, attached to the upper end of the said upright post 8. Ready movement of the stand is provided for by the rigid casters 11 and the swivel casters 12, said casters being located for proper load distribution.

In Figure 3 the reference point A represents the location of the propeller shaft centerline of the suspended engine. The suspension fork 10 is provided with roller or ball bearings 13, 14, and 15, arranged equidistant from the reference point A, the axes of said bearings lying in a common horizontal plane and converging toward the reference point A. When the engine is suspended from the suspension fork 10, the outer race surfaces of the bearings 13, 14, and 15 are in tangential relationship with the under surface 16 of the circumferential support flange 17 on the engine lifting cap 18, as shown in Figures 2 and 4. The bearing 13 is located at the crotch of the suspension fork 10 while the bearings 14 and 15 are located on the tines of the said suspension fork, the axes of said bearings 14 and 15 having sufficient forward deviation from reference line B to provide, with bearing 13, a stable three-point suspension for the circumferential support flange 17, while still allowing ample clearance for the insertion of the engine shaft into said suspension fork. A stop 19 is located at the end of each tine to prevent the engine lifting cap 18 from slipping out of the fork. The engine lifting cap is suitably threaded to engage the threaded shaft end of the engine to be suspended and is provided with a lifting eye 20, as is common practice.

To utilize our invention, the engine is hoisted by ordinary means, such as an overhead crane or other similar device, attached to the engine lifting cap 18, the engine shaft is placed in the suspension fork 10, and the engine is lowered until the circumferential support flange 17 rests upon the bearings 13, 14, and 15 which facilitate the manual rotation of the engine about its vertical axis.

The supporting structure 6 is preferably constructed of welded steel tubing, and the embodiment illustrated in the drawing is preferable where portability is desired. However, where a stationary installation of our suspension fork is desired, the said suspension fork may be supported by any other suitable means. It is conceivable that our invention may be used for suspending objects other than aircraft engines, therefore, where we use the term adaptor in the appended claims, we intend to be understood as meaning a device, such as a hook, a clamp, or threaded cap, which is adapted for attachment to a given object and for use with the suspension fork member herein described.

Our invention may be embodied in other specific forms without departing from the spirit or essential characteristics thereof. The present embodiment, as above set forth, is therefore to be considered in all respects as illustrative and not restrictive, the scope of our invention being indicated by the appended claims rather than by the foregoing description, and all changes which come within the meaning and range of equivalency of the claims are therefore intended to be embraced therein.

What we claim and desire to secure by Letters Patent is:

1. A utility stand comprising in combination: a base member; an upright post mounted upon said base member and having a suspension fork attached to its upper end, the tines of said fork lying side by side in a horizontal plane; a plurality of rollers pivotally mounted on said fork, the axes of said rollers converging in a common horizontal plane toward a common center; and an adaptor supported by said rollers and having a circumferential flange adapted to make tangential contact therewith; said adaptor at its upper end being provided with means for attachment to a hoist.

2. In combination: A suspension fork adapted to support an engine; and an adaptor having at its upper side means for attachment to a hoist, and at its lower side means for attachment to said engine, said adaptor also having a projecting flange disposed above the tines of said fork and between said two means.

3. Means for suspending an engine, comprising in combination: a fork member adapted at one end for attachment to any suitable supporting structure, and having at its other end two tines lying side by side in a horizontal plane; and an adaptor having at its upper side means for attachment to a hoist, and at its lower side means for attachment to the engine, said adaptor also having a projecting flange disposed above said tines and between said two means.

4. Suspension means as claimed in claim 3, in which said fork is provided with at least three spaced apart rollers arranged to engage the bottom surface of said flange.

KERMIT W. MAYNARD.
JOSEPH C. WEIDEL.

REFERENCES CITED

The following references are of record in the file of this patent:

UNITED STATES PATENTS

| Number | Name | Date |
|---|---|---|
| 1,467,082 | Baldwin | Sept. 4, 1923 |
| 1,595,676 | Merkert | Aug. 10, 1926 |
| 1,862,826 | Mross | June 14, 1932 |
| 2,195,100 | Smith | Mar. 26, 1940 |
| 2,343,757 | Egedal | Mar. 7, 1944 |